(12) United States Patent
Helwig

(10) Patent No.: US 6,491,826 B1
(45) Date of Patent: Dec. 10, 2002

(54) SYSTEMS AND METHODS FOR SEPARATION OF ORGANICS FROM FLUIDS

(75) Inventor: Neil Helwig, Mason, OH (US)

(73) Assignee: Marine Biotech Incorporated, Beverly, MA (US)

( * ) Notice: Subject to any disclaimer, the term of this patent is extended or adjusted under 35 U.S.C. 154(b) by 40 days.

(21) Appl. No.: 09/677,657

(22) Filed: Oct. 4, 2000

Related U.S. Application Data

(60) Provisional application No. 60/158,865, filed on Oct. 12, 1999.

(51) Int. Cl.⁷ .......................... C02F 1/24; A01K 63/04; B03D 1/14
(52) U.S. Cl. .................... 210/703; 210/169; 210/221.2
(58) Field of Search .......................... 210/221.2, 703, 210/169; 209/170

(56) References Cited

U.S. PATENT DOCUMENTS

| | | | | |
|---|---|---|---|---|
| 3,428,175 A | * | 2/1969 | Hukki | |
| 4,094,783 A | * | 6/1978 | Jackson | |
| 4,279,743 A | * | 7/1981 | Miller | |
| 4,665,632 A | * | 5/1987 | Greenwood | |
| 4,744,890 A | * | 5/1988 | Miller et al. | |
| 5,725,864 A | * | 3/1998 | Broussard, Jr. | |

FOREIGN PATENT DOCUMENTS

| | | | |
|---|---|---|---|
| DE | 235 565 | * | 5/1986 |
| EP | 634519 | * | 1/1995 |
| FR | 2 751 320 | * | 1/1998 |
| LU | 4 6 629 | * | 7/1964 |
| SU | 545385 | * | 3/1977 |
| WO | 88/02665 | * | 4/1988 |

* cited by examiner

Primary Examiner—Thomas M. Lithgow
(74) Attorney, Agent, or Firm—Foley Hoag LLP

(57) ABSTRACT

A system for facilitating the separation of materials dissolved from a fluid. The system includes an apparatus for separating proteins and other organics from fluid is provided. The apparatus includes a column having an interior chamber extending between a first end and a second end of the column. The apparatus also includes an inlet tangentially positioned relative to the interior chamber, so as to induce a cyclonic flow as fluid enters into the interior chamber. The apparatus further includes an injection port through which bubbles may be introduced into the fluid flow within the interior chamber. As the bubbles ascend materials dissolved in the fluid adhere to the bubbles an get carried upward towards the surface level of the fluid. Foam generated by the coalescing bubbles may be collected in a trough provided about the first end of the column and may be directed thereinto by a deflector.

29 Claims, 1 Drawing Sheet

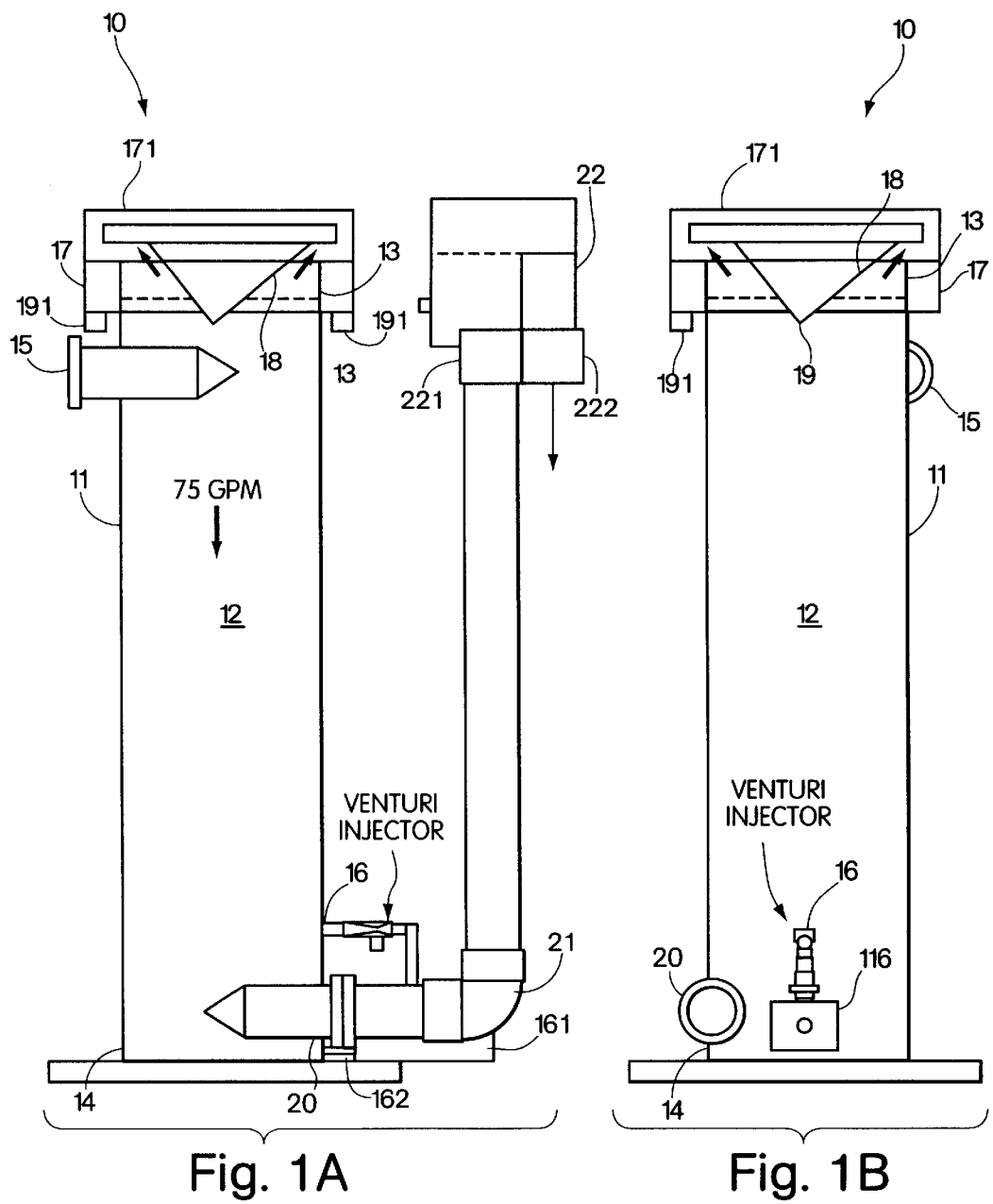

SYSTEMS AND METHODS FOR SEPARATION OF ORGANICS FROM FLUIDS

RELATED U.S. APPLICATION(S)

This application claims priority to U.S. Provisional Application Serial No. 60/158,865, filed Oct. 12, 1999, which application is hereby incorporated herein by reference.

FIELD OF THE INVENTION

The present invention relates to systems and methods for facilitating the separation of organics from fluids.

BACKGROUND ART

Protein removing devices have been used to remove dissolved proteins and/or other dissolved organic compounds from, for example, aquaculture fluid. These devices typically introduce a fluid to be treated through a top portion of a reactor vessel, and a countercurrent of air through a mechanism that creates bubbles near the bottom portion of the reactor vessel. As the bubbles rise up the reactor vessel through the fluid to be treated, proteins and/or other organics adhere to the bubbles and float to the surface level to the fluid in the vessel. The accumulation of the bubbles having the proteins and/or other organics adhering thereto at the surface of the fluid in the vessel generates foam. The foam can subsequently be removed to remove the proteins and/or other organics from the vessel. The current technology, however, may not provide a uniform interaction of the bubbles with the fluid to permit optimal removal of materials dissolved in the fluid. Moreover, current technology often requires the foam to travel a substantial distance along the surface of the fluid before being removed. As a result, a large amount of foam can burst and collapse during removal, which can lead to the redissolving of the removed proteins and/or other organics in the foam back into the fluid.

SUMMARY OF THE INVENTION

The present invention provides, in one embodiment, an apparatus for facilitating the separation of material dissolved from a fluid to be treated. The apparatus, in accordance with an embodiment, includes a column having an interior chamber extending between a first end and a second end of the column. The apparatus further includes an inlet in tangential communication with the interior chamber, so as to impart a cyclonic flow for fluid introduced through the inlet. Below the inlet, an injection port may be included through which bubbles can be introduced towards a central axis of the column. A trough may be situated circumferentially about the first end of the column for collecting foam generated by the coalescence of rising bubbles having material dissolved in the fluid adhering thereto. Adjacent the second end of the column, a first outlet may be provided in tangential communication with the interior chamber, so as to permit the cyclonic flow within the interior chamber to exit therefrom. A controller may be provided on the outlet to regulate outflow of treated fluid from the interior chamber. A second outlet may be provided in communication with the trough for removal of foam collected therein. In one embodiment of the invention, a deflector may be placed at the surface level of the fluid to enhance diversion of foam into the trough. Furthermore, an enclosure may be extended across the trough, so as to pressurize the fluid within the column to facilitate removal of foam through the second outlet.

The present invention also provides a method for treatment of fluid. The method includes imparting on the fluid a flow direction, which approximates a cyclonic pattern. Thereafter, the flow direction may be permitted to move axially downward while maintaining the cyclonic pattern. While maintaining this cyclonic pattern, bubbles may be injected transversely to the pattern towards a central axis, such that the bubbles rise through the fluid in a countercurrent manner relative to the flow direction towards a surface level of the fluid. Subsequently, materials dissolved in the fluid may be allowed to adhere to the rising bubbles and separate from the fluid. The introduction of bubbles into the cyclonic flow may result in a substantially uniform mixing and interaction of the bubbles with the fluid to permit optimal removal of materials from the fluid. Next, the bubbles may be permitted to coalesce into foam on the surface level of the fluid, and the foam removed.

In another embodiment, fluid to be treated may be introduced into an interior chamber of an apparatus through a tangential inlet in a manner which imparts a cyclonic flow within the interior chamber. The fluid may, thereafter, be subjected to a downward flow along the interior chamber while permitted to maintain a cyclonic pattern. Bubbles subsequently may be injected through an injection port, across the fluid flow, towards a central axis of the interior chamber, such that the bubbles may rise towards a surface level of the fluid in a countercurrent manner relative to the downward flow. Materials dissolved within the fluid may next be allowed to adhere to the rising bubbles, and the bubbles be permitted to coalesce into foam at the surface level of the fluid. The foam on the surface of the fluid may then be directed radially into a trough for removal.

BRIEF DESCRIPTION OF THE DRAWINGS

FIG. 1A illustrates, in accordance with an embodiment of the present invention, an apparatus for facilitating the separation of material dissolved in a fluid.

FIG. 1B illustrates the apparatus of FIG. 1A rotated at about ninety degrees about its longitudinal axis.

DESCRIPTION OF SPECIFIC EMBODIMENTS

Referring now to the drawing, FIGS. 1A–B illustrate, in accordance with an embodiment, an apparatus 10 for treatment of fluid, and in particular, for facilitating separation of material dissolved in a fluid to be treated. The apparatus 10 includes a column 11 having an interior chamber 12 extending between a first end 13 and a second end 14 of the column. The column 11, in accordance with one embodiment, may be substantially cylindrical in shape along its entire length. Although shown to be substantially cylindrical, it should be appreciated that the column 11 may be provided with any geometrical shape along its length, so long as the shape permits the column to maintain fluid to be treated therein.

The apparatus 10 also includes an inlet 15 in tangential communication with the interior chamber 12 (see FIG. 1B). The tangential positioning of the inlet relative to the interior chamber 12 permits fluid entering into the interior chamber 12 to flow along the wall of the interior chamber 12, resulting in a cyclonic flow circumferentially about the interior chamber 12. In one embodiment of the invention, the inlet 15 is positioned towards the first end 13 of the column 11, so as to optimize the pathway that fluid may travel within the interior chamber 12 for treatment. The apparatus 10 may further included an outlet 20 positioned adjacent the second end 14 of the column 11 to permit fluid from within the interior chamber 12 to exit the column 11. In accordance with one embodiment of the invention, the outlet 20 may be placed in tangential communication with the interior chamber 12, so as to accommodate exiting of the cyclonic flow of fluid from within the chamber 12.

An injection port 16 (i.e., diffuser) may be provided between the inlet 15 and the second end 14 of the column 11 through which, for example, air bubbles can be introduced into the fluid flow towards a central axis 16 of the column 11. In one embodiment, a positive pressure pump 161 may be coupled to the injection port 16 to generate bubbles for introduction into the fluid flow. Bubbles introduced into the fluid flow may be injected substantially transversely across the cyclonic flow towards the central axis 16, and allowed to ascend upward through the column 11 in a countercurrent manner relative to the downward movement of the cyclonic flow. As the bubbles ascend upward, materials dissolved in the fluid, such as proteins and/or other organics may adhere to the bubbles and float along with the bubbles to the surface level of the fluid. It should be appreciated that by introducing bubbles into a cyclonic flow, the bubbles can be uniformly mixed within the cyclonic flow, and the interaction between available the bubbles and the existing fluid maximized. By maximize the interaction between the bubbles and the fluid, the removal of dissolved materials in the fluid may be enhanced. In one embodiment, the injection port includes a venturi inlet, and may be configured so as to permit variation in the size of the bubbles, for instance from substantially fine to substantially coarse to facilitate adherence of the dissolved materials to the bubbles. Of course, other diffusers mechanisms may be used, for instance, porous diffuser pipe, perforated pipe, air-lift pumps, and U-tube systems. Moreover, in addition to or instead of air (e.g., oxygen), other gases may be used in the generation of bubbles. Ozone-enriched oxygen, for example, maybe used. The use of such gases can also facilitate the break down of organic materials in the fluid, thus promoting adherence of the organic materials to the bubbles. Once the bubbles with the materials in the fluid adhering thereto ascend to the surface level of the fluid, the bubbles are permitted to coalesce into foam.

A trough 17 may be situated circumferentially about the first end 13 of the column 11 for collecting foam generated by the coalescence of rising bubbles having material dissolved in the fluid adhering thereto. Placement of the trough 17 about the first end 13 of the column 11 permits a quick and effective method for foam collection. In particular, when foam is permitted to accumulate for an extended period of time on the surface level of the fluid, it can lead to the collapse of bubbles, thereby resulting in the redissolving of the materials back into the fluid. The trough 17 may be provided with a diameter D that is measurably larger than that of the column 11. In this manner, as new bubbles coalesce into new foam on the surface level of the fluid, existing foam may be quickly and efficiently pushed over the first end 13 of the column 11 into the trough 17 for collection.

To enhance diversion of foam from the surface level of the fluid into the trough 11 for collection, a deflector 18 may be situated at the surface level of the fluid. The deflector 18, as illustrated in FIGS. 1A–B, may be positioned in substantial axial alignment with the column 11, so as to direct the foam radially into the trough 17. The deflector 18 may include a gradient that points generally towards the axis 16 and terminates in an apex 19, which apex extends generally in a direction towards the second end 14 of the column 11. With such a configuration, the deflector 18 may be conical in shape; however, it may have other geometric shapes, for instance, square, pentagonal, or hexagonal, so long as its shape provides the deflector 18 with the ability to divert foam radially from the surface level of the fluid into the trough 17. In one embodiment of the invention, the deflector 18 may be free floating, such that it rises and fall with the rise and fall of the fluid level within the interior chamber 12 of the column 11. However, in a situation where the fluid level within the interior chamber 12 may be controlled, such that it does not vary substantially, the position of the deflector 18 relative to the column 11, should it be desired, may be fixed.

The trough 17 may be provided with a foam outlet 191 through which foam from within the trough 17 may be removed. The foam outlet 191 may be coupled to, for instance, a pipe (not shown) to provide a pathway along which foam may be directed from the trough 17. Although one outlet 191 may be sufficient, it should be appreciated that multiple outlets 19, as illustrated in FIG. 1A, may be provided to facilitate the removal of foam from the trough 17. To further facilitate the removal of foam through the outlet 191, an enclosure 171 may be provided across the trough 17. The placement of the enclosure 171 across the trough 17 creates a closed system within the apparatus 10 and acts to pressurize (i.e., generate positive pressure) an area within the trough 17 to push the foam through the outlet 191. The enclosure 171, in an embodiment, acts as a surface to which deflector 18 may be affixed to maintain its position relative to the column 11.

Looking still at FIGS. 1A–B, treated fluid which exits from the outlet 20 may be directed away from the apparatus 10 by pipe 21. In one embodiment of the invention, pipe 21 may extend upward towards the first end 13 of the column 11, and may include a controller 22 in order to regulate the outflow of treated fluid from the interior chamber and the level of fluid within the interior chamber 12. The controller 22, in one embodiment, may be an internal water level control, such as that shown in FIG. 1A, and may include an inlet 221 for receiving the fluid from pipe 21 and an outlet 222 for directing fluid away from the controller 22. The controller 22 may be placed at a height illustrated in FIG. 1A relative to the column 11, so that fluid flowing through the controller 22 may be permitted to approximate a height level similar to that of the fluid within the interior chamber 12. In this manner, the level of fluid within the interior chamber 12 may be maintained and the amount of outflow of treated fluid may be regulated. To adjust the level of fluid within the interior chamber 12, the level of fluid within the controller 22 may be lowered or increase accordingly. Although FIG. 1A illustrates one controller for use in connection with the apparatus 10 of the invention, other controllers may also be used to regulate the outflow and height level of treated fluid in the interior chamber 12, for instance, a valve.

In operation, the apparatus 10 of the present invention may have various applications, including being used as an organic separator.

As an organic separator, wherein organic materials dissolved in fluid may be separated from the fluid, the fluid to be treated may first be introduced through the inlet 15 and into the interior chamber 12 of column 11. Initially, when fluid is introduced through the inlet 15, the tangential nature of the inlet 15 relative to the interior chamber 12 forces the fluid to flow along the wall of the interior chamber 12, and subsequently in a cyclonic pattern circumferentially about the interior chamber 12. The cyclonic pattern of fluid flow, in an embodiment, permits the fluid to uniformly descend down the column 11 towards the outlet 20. As the cyclonic pattern descend downward, air bubbles may be introduced into the column 11, towards the center of the cyclonic pattern, by way of, for example, injection port 16. Generation of air bubbles may be facilitated by the use of a positive pressure pump 161. In one embodiment of the invention, fluid from within the interior chamber 12 may be drawn through the positive pressure pump 161 by way of pathway 162 and injected through the injection port 16. It should be noted that fluid from a source independent from that within interior chamber 12 may alternatively be used in the generation of bubbles. In order to facilitate the removal of materials from fluid, the bubbles injected into the fluid flow are preferably substantially uniform in size. The size of the bubbles, according to an embodiment of the present invention, however, may be varied to accommodate the different fluid environments, and may range from substantially fine to substantially coarse. Once within the cyclonic fluid flow, the bubbles may be uniformly mixed with the fluid and permitted to ascend upward, in a countercurrent manner to the descending fluid flow, towards the surface level of the fluid.

Along the way to the surface level, the ascending bubbles come into contact with materials, such as proteins or other organics, dissolved in the fluid, and provide a surface to which the materials may adhere and separate from the fluid. As the bubbles with the adhered material continue, thereafter, to ascend upward towards the surface level of the fluid, the now substantially purified fluid continues its downward path and exits through the outlet 20. Once the bubbles reach the surface level of the fluid, the bubbles are permitted to coalesce into foam. As more bubbles ascend to the surface level and coalesce into foam, the existing foam on the surface of the fluid is pushed radially into the trough 17. Foam within the trough 17 may be removed through the foam outlet 191.

Additional applications for the apparatus 10 of the present invention include using the apparatus as a gas-exchange chamber, for instance, as a $CO_2$ stripper.

As a $CO_2$ stripper, the fluid contaminated with $CO_2$ is introduced into the apparatus 10 and permitted to descend through the interior chamber 12 of column 11. While the fluid is descending through the chamber 12, a mixture of atmospheric air containing, for instance, oxygen and very little $CO_2$, and bubbles may be introduced through the injection port 16, such that once it is within the fluid flow, the mixture ascend up through the column 11 a countercurrent manner to the flow of fluid. As the mixture comes into contact with the $CO_2$-rich fluid, there is an exchange (i.e., diffusion/equilibration) of $CO_2$ molecules from the $CO_2$-rich fluid to the $CO_2$-poor mixture, resulting in the removal $CO_2$ from the fluid. At the same time, oxygen from the mixture may diffuse into the oxygen-poor fluid to oxygenate the fluid. The now purified fluid may continue down the column 11 and exit through the outlet 20. As for the $CO_2$-rich mixture, it may be removed from the trough 17 with the foam. Although $CO_2$ is provided as an example, the apparatus 10 may be used to exchange other gases or gaseous compounds. For example, the apparatus may be used to remove nitrogen gas from fluid, or in the creation of an anaerobic fluid environment by removing oxygen from fluid.

The apparatus may also be used as a mixing and blending vessel. Some of applications include, but are not limited to, acid mine neutralization of contaminated fluid generated during the metal mining process, industrial and chemical neutralization of acid baths used in the steel coating process, mixing and blending of medicine in the pharmaceutical industry, mixing and blending used for pigments and dyes, and mixing and blending used in agricultural chemicals.

While the invention has been described in connection with the specific embodiments thereof, it will be understood that it is capable of further modification. For example, the size of the various components of apparatus 10 may be modified accordingly to accommodate various applications. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. An apparatus for facilitating separation of material dissolved in a fluid, the apparatus comprising:
   a column having a central axis and an interior chamber extending between a first end and a second end of the column;
   an inlet in tangential communication with the interior chamber, so as to impart a cyclonic flow for fluid introduced through the inlet;
   an injection port situated below the inlet and through which bubbles may be introduced towards the central axis of the column;
   a trough situated circumferentially about the first end of the column for collecting foam overflowing from a surface level of the fluid, which foam being generated by adherence of the material dissolved in fluid to ascending bubbles; and
   a first outlet adjacent the second end of the column and in tangential communication with the interior chamber, so as to permit the cyclonic flow to exit from within the interior chamber.

2. An apparatus as set forth in claim 1, wherein the column is substantially cylindrical along its entire length.

3. An apparatus as set forth in claim 1, wherein the inlet is situated below the trough.

4. An apparatus as set forth in claim 1, wherein the injection port is a venturi inlet.

5. An apparatus as set forth in claim 1, further including a second outlet in communication with the trough for removal of foam collected therein.

6. An apparatus as set forth in claim 1, further including a deflector situated at the surface level of the fluid and in substantial axial alignment with the column to enhance diversion of foam into the trough.

7. An apparatus as set forth in claim 6, wherein the deflector is conical in shape with its apex extending in a direction toward the second end of the column.

8. An apparatus as set forth in claim 6, wherein the deflector is free floating on the surface level of the fluid in the column, so as to permit the deflector to adjust to varying levels of fluid.

9. An apparatus as set forth in claim 6, wherein the deflector is fixed in its position relative to the column.

10. An apparatus as set forth in claim 1, further including an enclosure extending across the trough, so as to pressurize the fluid within the apparatus to facilitate removal of foam through the second outlet.

11. An apparatus as set forth in claim 1, further including a controller on the outlet to regulate outflow of treated fluid from the interior chamber.

12. An apparatus as set forth in claim 11, wherein the controller is a fluid level control.

13. A system for treatment of fluid, the system comprising:
   a source of fluid to be treated;
   an apparatus in communication with the source, the apparatus including a column with an interior chamber, an inlet in tangential communication with the interior chamber for imparting a cyclonic fluid flow within the interior chamber, an injection port situated below the inlet and through which bubbles may be introduced into the interior chamber, a trough situated about a first end of the column for collecting, from a surface level of the fluid, overflowing foam generated by ascending bubbles, and an outlet in tangential communication with the interior chamber for removal of cyclonic fluid flow from within the interior chamber;

a first pathway extending from the source to the inlet of the apparatus;

a second pathway for directing fluid away from the outlet;

a pressurizing mechanism for generating bubbles introduced through the injection port; and a third pathway along which foam within the trough may be directed away from the trough.

14. A system as set forth in claim 13, wherein the pressurizing mechanism includes a positive pressure pump.

15. A system as set forth in claim 13, wherein the pressurizing mechanism includes a pathway leading from a second source of fluid, which fluid may be used in the generation of bubbles.

16. A system as set forth in claim 15, wherein the second source of fluid includes fluid from within the interior chamber.

17. A system as set forth in claim 13, further including a second pressurizing mechanism for pressurizing the interior chamber to facilitate removal of foam into and from the trough.

18. A system as set forth in claim 17, wherein the second pressurizing mechanism includes an enclosure extending across the trough.

19. A system as set forth in claim 13, further including a controller on the outlet to regulate outflow of treated fluid from the interior chamber.

20. An apparatus as set forth in claim 19, wherein the controller is a fluid level control.

21. A method for treatment of fluid, the method comprising:

imparting a flow direction for the fluid, which flow direction approximates a cyclonic pattern;

permitting the flow direction to move axially downward while maintaining the cyclonic pattern;

injecting bubbles towards the axis of the cyclonic pattern, such that the bubbles ascend in a countercurrent manner relative to the flow direction towards a surface level of the fluid;

allowing materials dissolved in the fluid to adhere to the ascending bubbles;

generating foam by permitting the ascending bubbles with the materials adhered thereto to coalesce on the surface level of the fluid; and tangentially removing, at an end opposite the surface level, fluid moving in the cyclonic pattern.

22. A method as set forth in claim 21, wherein the step imparting includes supporting the cyclonic pattern in a substantially tubular profile.

23. A method as set forth in claim 21, further including removing foam from the surface level of the fluid, so as to minimize redissolving or the materials adhering to the foam into the fluid.

24. A method as set forth in claim 23, wherein the step of removing includes directing the flow of foam radially away from the axis.

25. A method for treatment of fluid, the method comprising:

providing an apparatus having a column with an interior chamber, an inlet in tangential communication with the interior chamber, an injection port situated below the inlet and through which bubbles may be introduced into the interior chamber, a trough situated about a first end of the column for collecting, and an outlet in tangential communication with the interior chamber for removal of fluid from within the interior chamber;

introducing fluid to be treated through the inlet such that its tangential communication with the interior chamber imparts a cyclonic flow within the interior chamber;

permitting the cyclonic flow to move downward along the interior chamber;

injecting bubbles through the injection port towards a central axis of the column, such that the bubbles ascend, in a countercurrent manner relative to the downward flow, towards a surface level of the fluid;

allowing materials dissolved in the fluid to adhere to the ascending bubbles;

generating foam by permitting the ascending bubbles with the materials adhered thereto to coalesce on the surface level of the fluid; and collecting, within the trough, overflowing foam from the surface level of the fluid.

26. A method as set forth in claim 25, wherein the step of collecting includes directing the flow of foam radially away from the axis.

27. A method as set forth in claim 25, further including removing through the outlet the downward cyclonic flow.

28. A method as set forth in claim 25, further including removing the collected foam from the trough.

29. A method as set forth in claim 28, wherein the step of removing the collected foam includes generating a positive pressure within the interior chamber.

* * * * *